April 3, 1951 C. G. KIRKBRIDE 2,547,015
PROCESS FOR THE CONVERSION OF HYDROCARBONS IN THE
PRESENCE OF A SOLID PARTICULATE CONTACT MATERIAL,
UTILIZING A MOLTEN METAL AS THE CONVEYING MEDIUM
Filed Nov. 28, 1947 3 Sheets-Sheet 1

INVENTOR.
Chalmer G. Kirkbride
BY
Gordon A. Kessler
ATTORNEY.

April 3, 1951  C. G. KIRKBRIDE  2,547,015
PROCESS FOR THE CONVERSION OF HYDROCARBONS IN THE
PRESENCE OF A SOLID PARTICULATE CONTACT MATERIAL,
UTILIZING A MOLTEN METAL AS THE CONVEYING MEDIUM
Filed Nov. 28, 1947  3 Sheets-Sheet 2
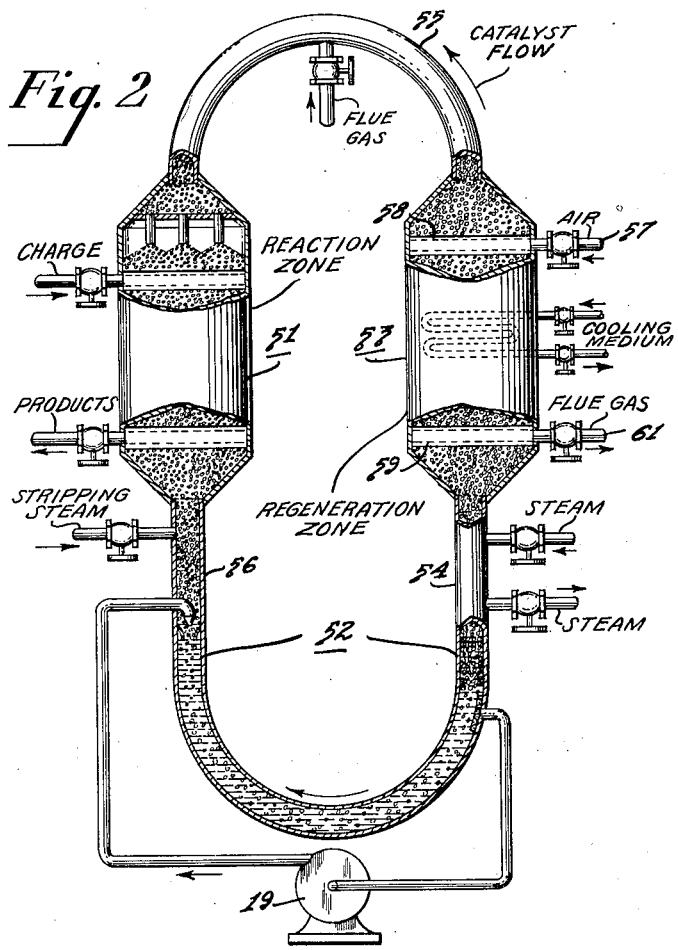
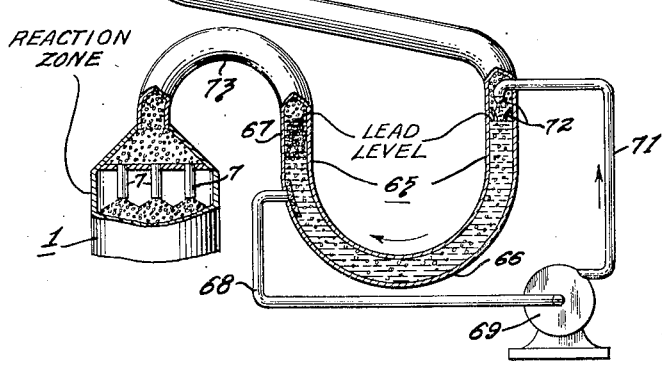
INVENTOR.
Chalmer G. Kirkbride
BY
ATTORNEY.

April 3, 1951  C. G. KIRKBRIDE  2,547,015
PROCESS FOR THE CONVERSION OF HYDROCARBONS IN THE
PRESENCE OF A SOLID PARTICULATE CONTACT MATERIAL,
UTILIZING A MOLTEN METAL AS THE CONVEYING MEDIUM
Filed Nov. 28, 1947  3 Sheets-Sheet 3
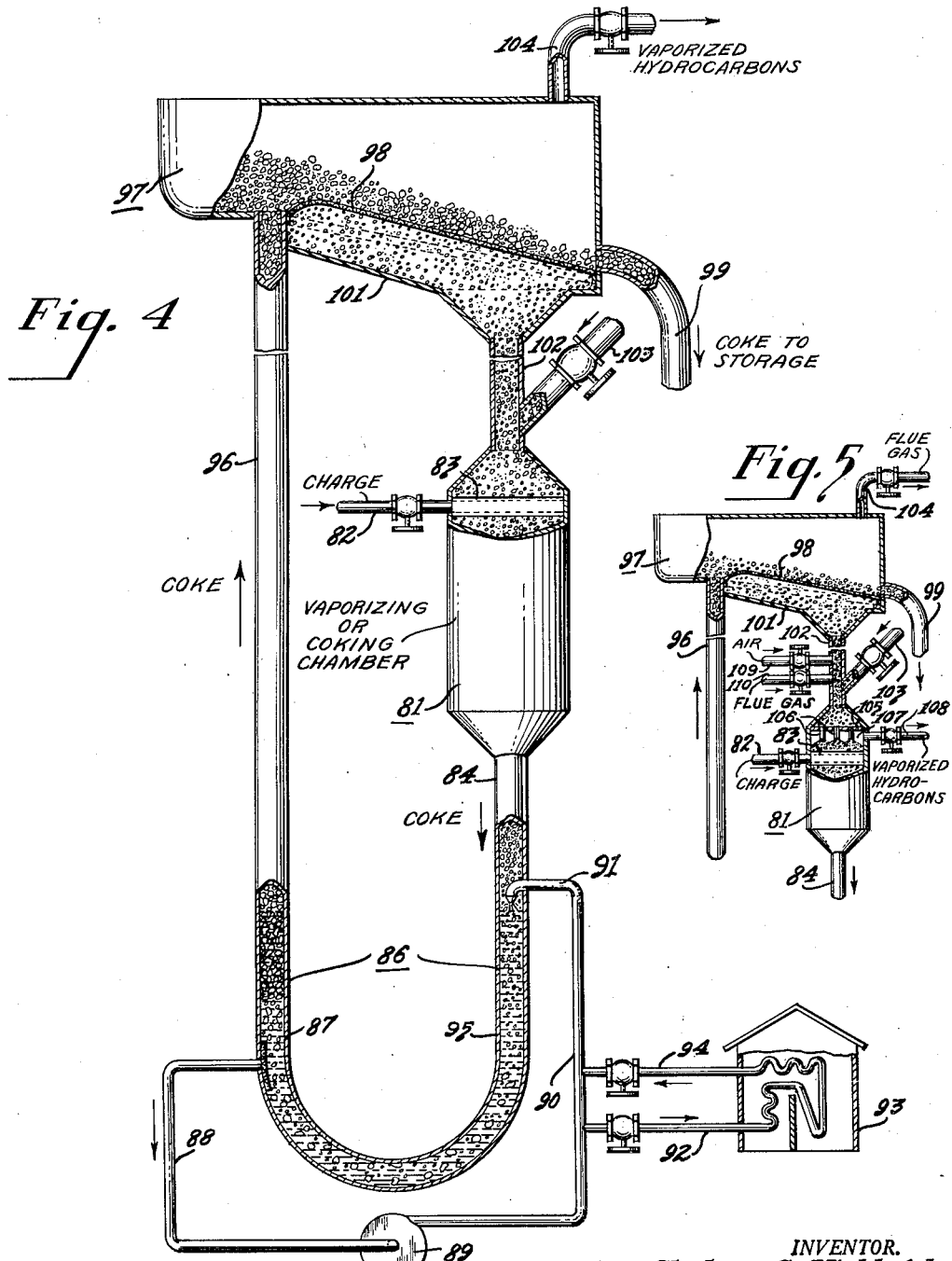
INVENTOR.
Chalmer G. Kirkbride
BY
Gordon A. Kessler
ATTORNEY.

Patented Apr. 3, 1951

2,547,015

UNITED STATES PATENT OFFICE 2,547,015

PROCESS FOR THE CONVERSION OF HYDROCARBONS IN THE PRESENCE OF A SOLID PARTICULATE CONTACT MATERIAL, UTILIZING A MOLTEN METAL AS THE CONVEYING MEDIUM

Chalmer G. Kirkbride, Wallingford, Pa., assignor to Houdry Process Corporation, Wilmington, Del., a corporation of Delaware Application November 28, 1947, Serial No. 788,629

5 Claims. (Cl. 196—52)

This invention relates to an improved process of carrying out operations wherein fluid substances are contacted with contact materials. More particularly, the invention relates to a process of carrying out operations wherein hydrocarbons are contacted with moving solid catalysts.

Since the invention is especially valuable when applied to hydrocarbon treating or conversion processes, most of the following description will be concerned particularly with such processes, especially catalytic cracking of hydrocarbons. Widely-used catalytic cracking systems involve the combination of a reactor and a regenerator through which the catalyst in solid particulate form is caused to move continuously. In the simpler of these systems the catalyst in the form of pellets or beads is passed downwardly through both the reactor and regenerator as a solid or substantially solid bed. To transport the catalyst to the top of the reactor and the regenerator, a mechanical bucket elevator has been employed.

I have discovered in accordance with the invention that a contact material, such as a solid cracking catalyst in particulate form, can be caused to move through a contacting or catalytic system such as described above by incorporating in the system a zone wherein the necessary kinetic energy is imparted to the contact material through the use of a liquid of higher density than the contact material and such properties that the contact material is not adversely affected by contact therewith. The kinetic energy zone comprises a confined body of the high density liquid supporting a moving column of the contact material. The contact material is caused to enter the lower portion of this body of liquid and then to move upwardly to join the column of moving contact material. It is considered preferable that the energy zone be in essence U-shaped. The contact material enters one arm of the zone, and is forced into the liquid in the other arm, which supports the moving column of contact material.

The high density liquid to be employed in a given process will depend primarily upon the contact material used and the temperature at which the process is carried out. Any material, liquid under the existing temperature and pressure conditions and having a higher density than the contact material or catalyst, and not adversely affecting the properties of the contact material or catalyst may be employed. If the contact material is porous it is also important that the high density liquid should have little if any wetting effect since otherwise the density of the contact material containing absorbed high density liquid would approach the density of the high density liquid, making the process relatively inefficient. Liquids having the characteristics of not having a substantial adverse effect on the properties of the contact material and, if the contact material is porous, not substantially wetting the contact material are referred to hereinafter as being substantially inert with respect to the contact material. For high temperature operation it is generally preferred to use a molten heavy metal, especially molten lead. Materials such as mercury, molten tin, molten alloys, and the like, may also be used. Also, in certain types of operations heavy organic liquids, such as ethylene tetrabromide may be used.

Several embodiments of the invention are illustrated in the accompanying drawings, in which:

Figure 2 is a similar view of a related system but in which the elements are differently disposed;

Figure 3 is a diagrammatic fragmentary view of a portion of a system including a positive sealing device between the reaction and regeneration zones;

Figure 4 is a diagrammatic view of a system adapted particularly for accomplishing coking of heavy hydrocarbon oils;

Figure 5 is a diagrammatic fragmentary view of a modification of a system such as disclosed in Figure 4; and Figure 6 is detailed view of a modified form of a kinetic energy producing device.

Figure 1:
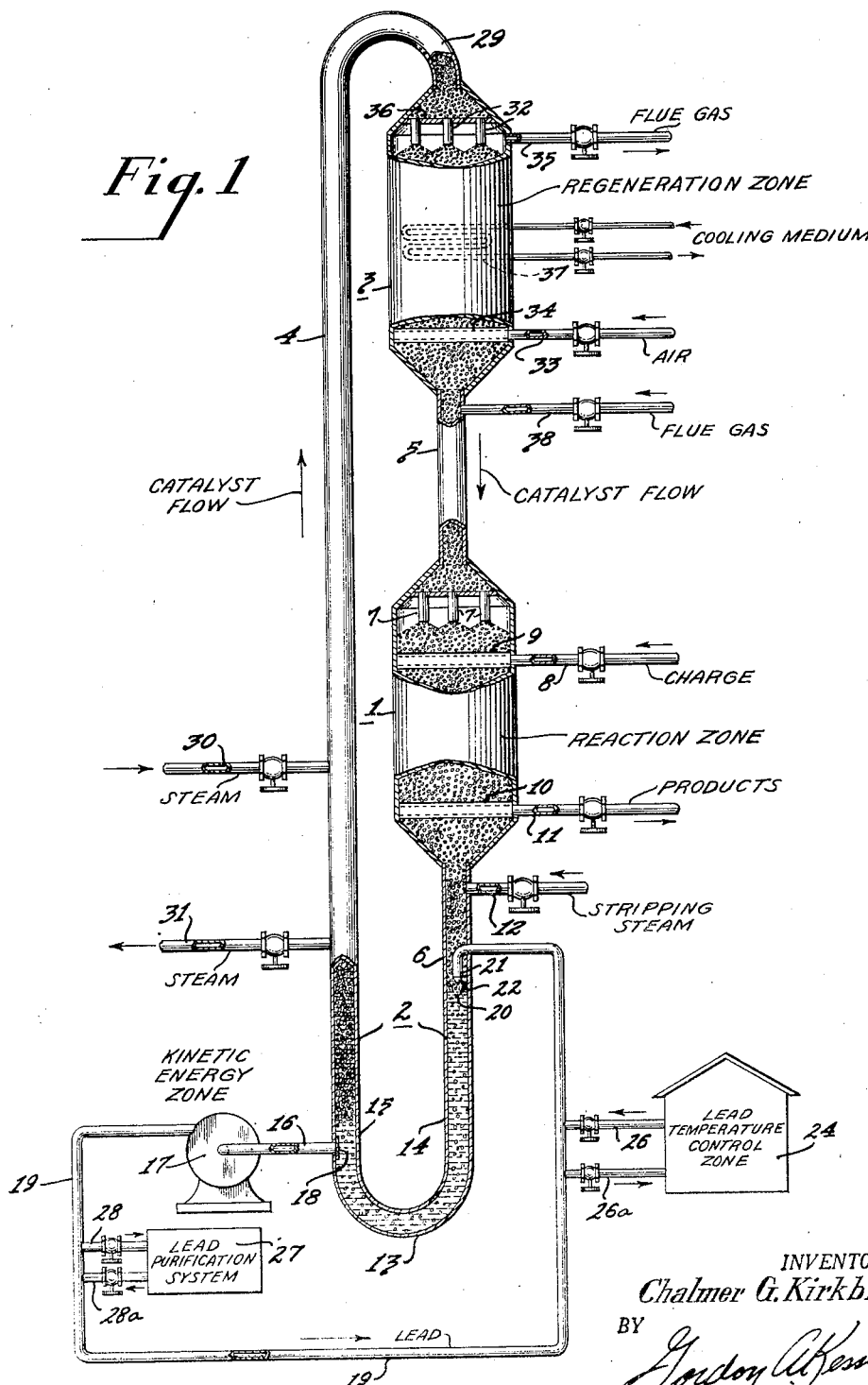
Figure 1 is a diagrammatic view of a moving catalyst system particularly adapted for accomplishing catalytic cracking of hydrocarbons.

In Figure 1, I have shown a continuous system for accomplishing catalytic cracking of hydrocarbon oils including a reaction zone 1, a kinetic energy zone 2, and a regeneration zone 3, these zones being connected by means of conduits 4, 5 and 6. It will be understood that specific details of the construction of the vessels constituting the reaction, regeneration and the kinetic energy zones have been omitted in the interests of simplifying description of the essential features of the invention.

As shown, the catalyst in particulate form moves continuously in cyclic fashion through the system. The catalyst employed in this example is a synthetic silica-alumina catalyst in form of beads about ⅛" in diameter. The catalyst at most is only slightly wetted by the lead so that absorbed lead does not increase the density of the catalyst appreciably. In the system shown the catalyst entering the molten lead is further protected from the wetting and deactivating effect of lead by the carbonaceous deposit formed in the reaction.

The catalyst at a temperature of about 850° F. to 1000° F. enters the reaction zone through downcomer pipes 7 which serve to distribute the catalyst evenly over the cross-section of the zone. Thereafter, the catalyst moves as a solid bed downwardly through the zone. As shown, the charge, which may be a heavy petroleum oil in vapor phase or mixed phase at a temperature of 700° to 850° F. or substantially at the catalyst temperature, is introduced into the zone through line 8 and distributor 9. The distributor shown is simply a perforated pipe. The charge, therefore, contacts the catalyst, is cracked and is removed from the reaction zone by a collector 10 and line 11. The catalyst on passing into the conduit 6 from the reaction zone is contacted with stripping steam, introduced through line 12, to remove any remaining hydrocarbons. The catalyst, however, will have accumulated a carbonaceous deposit which, by way of example, may amount to 7 to 20 grams per liter of catalyst. The catalyst containing this deposit then enters what I have termed the kinetic energy zone.

This zone is shown as comprising a U-shaped conduit 13 having an arm 14 leading from conduit 6 and an arm 15 leading to conduit 4. This conduit contains a body of molten lead, which may be at the same temperature as the catalyst leaving conduit 6 or at a higher or lower temperature depending upon the results desired. The body of lead extends to the height shown in arm 15 and in any event there should be a selected amount of lead in this system so that if the movement of lead and catalyst is halted temporarily the lead level in each arm is sufficient to support freely the column of catalyst above it and yet not rise into the reaction zone. This amount of lead also should be at least sufficient to support a column of catalyst of greater height than the length of conduit 4 above the lead level. Since the ratio between the densities of the catalyst and the lead in this case is about fifteen, an amount of lead should be employed in the kinetic energy zone such that there is at least a column of lead in arm 15 one-fifteenth as high as the column of catalyst in conduit 4. It is preferred, however, to use an excess amount of lead such that the column of lead is at least one-tenth as high as the column of catalyst.

The kinetic energy zone also comprises a lead circulation system. There is provided a line 16 through which the lead is pumped by means of pump 17, the passage of catalyst into line 16 being prevented by a screen 18 disposed in arm 15. From the pump the molten lead passes through a line 19 leading to a jet pump or aspirator 20 consisting of a nozzle 21 and a restricting member 22 in arm 14. As the catalyst enters the kinetic energy zone, it is forced by the lead ejected by nozzle 21 rapidly downwardly through arm 14, past the bottom of the U-shaped section and into the body of lead in arm 15. It is caused to move upwardly in this arm both by the difference in density between the lead and catalyst and the upward flow of the lead towards screen 18. Where lead and the silica-alumina bead catalyst are used this difference is considerable as the catalyst has a density of about 0.7 gram per cubic centimeter and the lead a density of about 11 grams per cubic centimeter.

In ordinary operation, it will not be necessary to heat or cool the molten lead as the lead lines and the conduit 13 will be protected from heat losses by means of insulation, not shown, and the lead will be constantly in contact with hot catalyst. However, this energy system can be used to vary or control the temperature of the catalyst. To accomplish this I have shown a temperature control zone 24 which is connected to lead line 19 by means of valved lines 26 and 26a. A portion of the circulating lead may be taken off continuously or intermittently for heating or cooling in the temperature control zone, which may contain any suitable or conventional type of heating or cooling device. The direct contact of the lead with the catalyst is an effective method of accomplishing direct heat exchange.

In order to operate the present process effectively it is necessary that substantial changes in the lead medium be avoided. Such changes include the conversion of a part of the lead to lead sulfide due to the action of sulfur in the carbonaceous deposit on the catalyst. Since most of if not all petroleum cracking stocks contain some sulfur, it will normally be the case that sulfur will be present in the deposit. To avoid the continuance of changes in the lead and the accumulation of lead compounds, it is desirable in most cases to provide a means for continuously purifying the lead (or other high density liquid if another be used). Accordingly, it is preferred to pass a part of the lead in each cycle or in a selected proportion of the cycles through a lead purification system which is indicated generally at 27, the lead passing to this system through line 28 and being returned to line 19 through line 28a. The particular method of purification forms no part of the present invention as any conventional method for converting lead sulfide to the metal may be employed. For example, the lead containing lead sulfide may be cooled to effect fractional crystallization of the lead sulfide which may be separated from the purified lead which is then returned to the system. The lead sulfide may be oxidized to lead oxide which is then reduced with a reducing agent such as hydrogen to form the metal, which may then be returned to the system.

From the lead in arm 15 the catalyst moves regularly up conduit 4 as a solid column and is caused to pass through the upper U-shaped section 29 of this conduit. The rate of this movement is dependent upon the rate at which the catalyst is caused to pass into the lower part of arm 15. As a particle of catalyst enters the mass supported by the lead in arm 15 another particle is caused to pass through the U-shaped section 29. The kinetic energy imparted to the catalyst is of course dependent upon the energy supplied by the lead pump. To remove lead or lead vapor from the catalyst in conduit 4, I provide a seal of inert gas, preferably steam. The steam is introduced through line 30 and removed through line 31. Thereafter, the catalyst moves downwardly into and through the regeneration zone by gravity. The catalyst enters the regeneration zone through downcomer pipes 32 and is removed through conduit 5. The air or other oxidizing gas necessary to burn off the carbonaceous deposit on the catalyst is introduced into the regeneration zone through line 33 and distributor 34. The flue gas formed during burning of the carbonaceous deposit on the catalyst is conveniently removed from this zone through line 35 leading from the open space formed by the downcomer pipes 32 and supporting plate 36.

Since it is important that the temperature of the catalyst should not rise to a point such that the catalyst would become deactivated, it is desirable to provide means for absorbing the heat of regeneration, shown as a cooling coil 37. While it is possible to control this temperature by moving the catalyst at a faster rate, thereby reducing the amount of carbonaceous deposit per unit weight of catalyst formed during the cracking reaction and consequently reducing the heat produced per unit weight of catalyst, the provision of cooling means incorporates important flexibility of operation into the system.

The catalyst flows by gravity from the regeneration zone into conduit 5 which leads to the reaction zone. To seal the regeneration zone from the reaction zone, flue gas is introduced into the catalyst stream through line 36. The introduction of flue gas is controlled so that the pressure drop between the point of introduction of this gas and the point of introduction of the charge is substantially zero, in order that no oxidizing gas from the regeneration zone can enter the reaction zone to react with the charge, and that no charge can enter the regeneration zone. To insure that the pressure relation between the point of introduction of flue gas and the point of introduction of charge is maintained, the unit will preferably comprise a pressure control system, not shown, whereby should there be a change in this relation, the introduction of charge will be automatically shut off.

It will be seen that the system disclosed in Figure 1 is an effective method of accomplishing catalytic cracking. The system is completely flexible from the standpoint of rate of catalyst circulation since this rate can be controlled by varying the rate of flow of lead in the kinetic energy zone through regulation of operation of pump 17. As above indicated, this means that the catalyst-oil ratio can be increased so as to simplify materially the construction of the regenerator, making possible the elimination or reduction of cooling by indirect heat exchange in the generator. The catalyst-oil ratio by weight in this system may be, for example, 1:1 to 10:1. This may be sufficiently high that a high average temperature may be maintained in the reactor, such as an average temperature of 950° to 1000° F. It should also be noted that in the arrangement shown the regeneration zone is disposed above the reaction zone. This is advantageous in that there is little opportunity for heat losses from the catalyst in moving from the regeneration zone to the reaction zone. The system shown in Figure 1 is also advantageous in that it is a closed system and may be maintained at any desired pressure. While in catalytic cracking it is not necessary to maintain a pressure substantially above atmospheric, in other processes, for example, catalytic hydrogenation of unsaturated hydrocarbons, elevated pressures are necessary.

The system disclosed in Figure 2 is in general similar to that just described. In the system disclosed in this figure, however, the reaction zone and the regeneration zone are disposed side by side. Also, the catalyst is caused to move upwardly as a solid column through the regenerator.

The system disclosed in this figure comprises a reaction zone 51, a kinetic energy zone 52, and a regeneration zone 53, these zones being connected by conduits 54, 55 and 56. Since aside from the regeneration zone these elements are essentially the same as the corresponding elements in Figure 1, they will not be further described. The catalyst containing a carbonaceous deposit moves upwardly through the regeneration zone where it is contacted with air introduced through a line 57 leading to a distributor 58. The flue gas formed by burning of the carbonaceous deposit is removed through collector 59 and line 61. By arranging the system as shown in Figure 2, the height of the unit may be reduced.

It will be noted that in this system, like that shown in Figure 1, the catalyst in the kinetic energy zone in contact with the lead has come from the reactor and therefore contains a carbonaceous deposit. This deposit protects the catalyst from the lead both from the standpoint of catalyst activity and that of absorbing or being wet by the lead so as to increase the density of the catalyst and reduce the efficiency of the kinetic energy zone.

The systems used in both Figures 1 and 2 are characterized in that the pressure differential between the reaction zone and the regeneration zone is not great so that a flue gas seal can be used. Should it be desired to operate these zones at substantially different pressures, it is preferred to employ a more complex sealing arrangement. Such an arrangement is shown in Figure 3, which is a fragmentary portion of a system such as disclosed in Figure 1. Where applicable, the same reference numerals are applied to the same elements in the two figures. It will be understood that the system includes a kinetic energy zone as disclosed in Figure 1. Referring to Figure 3, the catalyst leaving the regeneration zone 3 is passed through line 5 to a sealing zone 65 which is similar in structure to the kinetic energy zones of Figures 1 and 2. Thus, this zone comprises two arms 66 and 67 of a U-shaped conduit containing a body of molten lead and a system for recycling the lead comprising line 68, pump 69, line 71 and pump or aspirator 72. The seal shown is operated generally as previously described. However, the body of catalyst is caused to move only over the U-bend 73 so that it may flow by gravity through the reaction zone. The use of this mechanism as a seal serves to bring out that the energy imparted to the moving catalyst in the energy zones of Figures 1 and 2 is dependent upon the energy imparted to the lead in the lead pump. Thus, the pump must supply sufficient energy to the moving stream of catalyst to cause the catalyst to move through the system at the desired rate. Of course, since the lead in arm 67 need only support a column of catalyst of sufficient height to pass U-bend 73, the amount of lead in the seal will be materially less than that in the energy zone. It will be understood that other types of seals may be employed in place of that disclosed in Figure 3. Suitable seals are disclosed, for example, in U. S. Patents Nos. 2,268,535, 2,331,938, and 2,357,694 to A. H. Schutte.

The foregoing disclosure with respect to a catalytic cracking operation is merely illustrative. It will be recognized that other types of catalysts may be used, such as other synthetic cracking catalysts, for example, silica-zirconia, silica-magnesia and silica-alumina-zirconia catalysts; and clay catalysts, for example, catalysts obtained from an acid-treated montmorillonite clay. Where the operation is carried out to accomplish the reforming of virgin or thermally cracked naphthas a bauxite catalyst may advantageously be used. While it is preferred to operate the cracking or reforming process at a temperature above 800° F. the invention includes cracking or reforming operations carried out at lower temperatures, such as temperature as low as 700° F., a suitable range being 700° to 1100° F. The system, as generally illustrated, may also be employed to accomplish dehydrogenation of paraffin hydrocarbons using catalysts effective for this operation; such as oxides of the metals of group VI of the periodic table which may be deposited on a support such as activated alumina.

Referring now to Figure 4 of the drawings, I have shown a system adapted for coking a heavy hydrocarbon charge, such as a reduced crude, to produce coke and vaporized hydrocarbons adapted for introduction into a conventional catalytic cracking unit to convert the hydrocarbons to high octane gasoline hydrocarbons. Preferably the vaporized hydrocarbons are passed to a catalytic cracking unit such as shown in Figure 1 or Figure 2 of the drawing.

The contact material employed in the system of Figure 4 is one that is inert or substantially inert catalytically, such as a fused inorganic oxide, for example, fused alumina. It is preferred, however, to employ as the inert material coke in particulate form; e. g., in the form of granules. In this system, the coke at an elevated temperature adapted to effect coking and vaporization of the charge, for example, a temperature of 1000° to 1100° F., is flowed by gravity into the top of a vaporizing or coking chamber 81. The charge is introduced into the chamber through a line 82 and a distributor 83. The charge should be at an elevated temperature such as 700° to 750° F. at which premature decomposition of the charge is avoided. On coming into contact with the coke, a portion of the charge is immediately vaporized directly or after being vis-broken and passes out of the top of the vaporizer. The remainder of the charge passes downwardly through the chamber in contact with the coke. The time involved is sufficient to convert a portion of this remainder into coke and the rest into vis-broken and vaporized hydrocarbons which are removed from the top of the vaporizer. The coke formed in this chamber is deposited or absorbed on the coke granules and therefore becomes a part of these granules, resulting in increasing the size of the granules. Since heat is lost during the reaction, the temperatures of the bed of coke are progressively lower as the bottom of the chamber is approached.

The coke leaves the chamber 81 through a conduit 84 and enters a kinetic energy zone indicated generally at 86. This energy zone or system is constructed and operates in the same manner as before described in connection with Figures 1 and 2. In this instance, however, it is an important feature that the lead is heated during its circulation. Thus, the molten lead removed from arm 87 through line 88 by means of pump 89 and then passed through line 90 leading to lead nozzle 91, must be raised in temperature sufficiently to compensate for the endothermic heat of coking and vaporization, and the heat losses in the system. To accomplish this, a part of all of the lead flowing in line 90 is continuously passed through valved line 92 leading to a furnace 93 of conventional design whereby the lead temperature may be raised to the desired point by indirect heat exchange. The hot molten lead is then returned to line 90 through valved line 94. The lead, maintained at a higher temperature than the coke, mixes with the coke in arms 95 and 87 of the kinetic energy zone and the coke is accordingly elevated in temperature. In this case, therefore, all of the needed energy, both heat and kinetic, is supplied to the unit in the energy zone.

The coke after passing through the energy zone is moved as a solid column through conduit 96 and into a separation chamber 97 provided with an inclined screen 98 down which the coke moves. If desired, this screen may be vibrated by any suitable mechanism, not shown. The size of the openings in the screen are selected so that the larger coke granules are retained on the screen and are passed to storage through conduit 99. These granules are those which have accumulated coke from the charge and are a valuable product. The coke granules passing through the screen move down the inclined bottom 101 of the chamber 97 and thence through line 102 into the top of the vaporizing or coking chamber. Make-up coke may be introduced through pipe 103. The vaporized hydrocarbons removed from the top of the coking chamber pass through the separation chamber and out of the unit through line 104. As stated previously, these hydrocarbons are preferably passed to a catalytic cracking unit since they are adapted particularly for such use. However, some gasoline will normally be produced in the vaporizing and coking step and it may be desirable to remove this fraction by fractionation and employ only the gas oil fraction in catalytic cracking.

Figure 5 discloses a coking and vaporizing operation in most respects similar to that disclosed in Figure 4; however, a part or all of the heat necessary for the operation is produced by burning coke deposited on the contact mass in the coking and vaporizing chamber. In Figure 5, the same reference numerals are applied to similar elements as in Figure 4 and it will be understood that the parts not shown are identical with those disclosed in Figure 4. The vaporizing or coking chamber 81 is modified to the extent that it contains a plate 105 supporting downcomer pipes 106 and forming a vapor disengaging space 107. A pipe 108 is provided for removing vaporized hydrocarbons from the disengaging space. Also, conduit 102 is of sufficient length to provide burning space and time, and a pipe 109 is provided for introducing air or other oxidizing gas into the coked mass flowing into conduit 102. Further, to prevent any possibility of the charge entering the burning zone or air entering the coking or vaporizing chamber, flue gas or other inert gas such as steam is introduced into line 102 through line 110.

The process illustrated in Figure 5 is carried out in the following manner. The coked mass moving downwardly in conduit 102 is contacted with a controlled amount of air introduced through line 109 and a predetermined amount of the coke deposited on the mass is burned to produce a part or all of the heat necessary for the coking and vaporizing step. The hot mass then flows to plate 105, through downcomer pipes 106 and forms a solid moving bed in chamber 81. The charge is introduced through line 82 and distributor 83 and the vapors formed are disengaged in space 107 and removed through line 108. The flue gas formed in the burning zone in conduit 102 is removed from the system through line 104. The coked mass leaving the bottom of chamber 81 is handled as disclosed in Figure 4 except that if sufficient heat is produced in the burning zone, the heating step practiced in heater 93 may be omitted, and in any event less heat is added to the lead in this heater.

The systems previously described have included a kinetic energy zone comprising a pump for causing the contact material to enter the body of high density liquid supporting the moving column of the material. A pumping arrangement is considered to constitute a preferred means of obtaining the full advantages of the invention. It will be understood, however, that the invention is not limited to such arrangements but includes any method or means of causing the contact material to enter the body of high density liquid. A suitable structure for this purpose is shown in Figure 6. This figure shows a kinetic energy system which may be considered as disposed in the bottom portion of a unit such as disclosed in the other figures of the drawings. The contact material flows from a reaction chamber, not shown, through a conduit 111 to one arm 112 of a U-shaped conduit 113 having another arm 114. The U-shaped conduit is filled with a high density liquid such as molten lead to the levels shown. Disposed in the arm 112 is a screw conveyor 115 which is rotated by a pulley 116. The catalyst entering the arm 112 is forced by means of the screw conveyor downwardly through the molten lead in this arm and caused to pass into the body of lead in arm 114, through which it rises due to the difference in density between the contact material and the lead. Thereafter, at a rate determined by the rate of rotation of the screw conveyor, the contact material rises in conduit 117 to the top of the regeneration zone or coking chamber as the case may be. To remove lead from the contact material, steam may be introduced through line 118 and removed through line 119.

It will be understood that although a purification system for the lead or other high density liquid has not been discussed except in connection with Figure 1, such a system may be included in any of the units in cases where the high density liquid accumulates impurities.

Obviously many modifications and variations of the invention as hereinbefore set forth may be made without departing from the spirit and scope thereof and therefore only such limitations should be included as are indicated in the appended claims.

I claim as my invention:

1. A process comprising continuously moving fluent solid contact material in particulate form through a system comprising a contact zone wherein the contact material is contacted with a heavy hydrocarbon oil under conversion conditions and a kinetic energy zone wherein at least substantially all of the force necessary to cause the contact material to move through the system is applied to the contact material, said force being continuously applied by moving downwardly by gravity a compact column of contact material that has passed through said contact zone and injecting into said column a downwardly directed stream of molten metal, said molten metal, together with commingled contact material, flowing through an essentially U-shaped zone, said contact material being forced by the injected stream of molten metal downwardly in the first arm of the U-shaped zone and thereafter rising by the aid of buoyant force through molten metal in the second arm of said U-shaped zone so as to accumulate a column of contact material extending to a level extending to the top of said system, removing a stream consisting substantially solely of molten metal from a position in the second arm of the U-shaped zone, imparting kinetic energy to said stream consisting substantially solely of molten metal in a zone outside of said U-shaped zone, and employing said stream to which kinetic energy has been imparted as the stream of molten metal injected into said column of downwardly moving contact material.

2. A process in accordance with claim 1 in which the contact material is coke.

3. A process in accordance with claim 1 wherein the contact material is substantially catalytically inert and the heavy hydrocarbon oil is coked and vaporized, at least a portion of the heat necessary to accomplish coking and vaporizing is supplied by heating said contact material and transmitting said heat to said contact material by direct heat exchange.

4. A process in accordance with claim 1 wherein at least a portion of the heat necessary to effect conversion of the heavy hydrocarbon oil is supplied by burning coke deposited on said contact material.

5. A process in accordance with claim 1 wherein said contact material comprises a hot hydrocarbon conversion catalyst, wherein said heavy hydrocarbon oil is converted at least partially into gasoline and wherein at least a portion of the heat necessary to effect said conversion is supplied by burning coke deposited on said contact material.

CHALMER G. KIRKBRIDE.

REFERENCES CITED

The following references are of record in the file of this patent:

UNITED STATES PATENTS

| Number | Name | Date |
| --- | --- | --- |
| 1,948,345 | Garofalo | Feb. 20, 1934 |
| 2,268,535 | Schutte | Dec. 30, 1941 |
| 2,348,699 | Tuttle | May 9, 1944 |
| 2,357,694 | Schutte | Sept. 5, 1944 |
| 2,370,950 | Gibb et al. | Mar. 6, 1945 |
| 2,453,458 | Reed et al. | Nov. 9, 1948 |